United States Patent

Brum

[11] Patent Number: 5,249,924
[45] Date of Patent: Oct. 5, 1993

[54] RAM AIR TURBINE

[75] Inventor: Roger D. Brum, Irvine, Calif.

[73] Assignee: Southwest Aerospace Corporation, Tustin, Calif.

[21] Appl. No.: 839,923

[22] Filed: Feb. 21, 1992

[51] Int. Cl.$^5$ .............................. F01D 7/02
[52] U.S. Cl. ........................ 416/48; 416/152; 416/155; 416/160; 416/162
[58] Field of Search ............ 416/2, 44, 48, 51, 142, 416/152, 155, 160, 162, 170 R

[56] References Cited

U.S. PATENT DOCUMENTS

| | | | |
|---|---|---|---|
| 2,327,216 | 8/1943 | Reiber | 416/48 |
| 2,661,806 | 12/1953 | Nims et al. | 416/48 |
| 2,669,310 | 2/1954 | Haskins | 416/48 |
| 3,037,559 | 6/1962 | Blackburn | 416/48 |
| 3,801,219 | 4/1974 | Parsons et al. | 416/160 |
| 3,902,822 | 9/1975 | Andrews et al. | 416/160 |
| 4,692,093 | 9/1987 | Safarik | 416/48 |
| 4,701,104 | 10/1987 | Cohen | 416/44 |

OTHER PUBLICATIONS

HDUC Component Set–brochure–4 pages.
MK 32 2800 Refuel POD–brochure–3 pages.
B-2 Stealth bomber–photograph–Associated Press.

Primary Examiner—Edward K. Look
Assistant Examiner—Michael S. Lee
Attorney, Agent, or Firm—Stetina and Brunda

[57] ABSTRACT

The present invention relates to a ram air turbine which is preferably used in conjunction with a refueling pod on an aircraft for purposes of operating a fuel pump and/or reeling mechanism for paying in and paying out a fuel line. The turbine generally comprises a rotatable housing having a main turbine output shaft disposed therein and rigidly connect thereto. A plurality of variable pitch turbine blades extend outwardly from and are cooperatively engaged to the housing such that rotation of the turbine blades causes simultaneous rotation of the housing and output shaft. Means are provided within the housing for establishing a preset reference rotational speed for the output shaft. Additionally, a control means cooperatively engaged between the turbine blades and the reference means is provided for adjusting the pitch of the turbine blades in response to a difference in the rotational speed of the output shaft and the preset reference rotational speed. The ram air turbine further includes both electrical and mechanical braking devices for changing the pitch of the turbine blades when the rotational speed of the output shaft exceeds a pre-determined maximum.

9 Claims, 4 Drawing Sheets

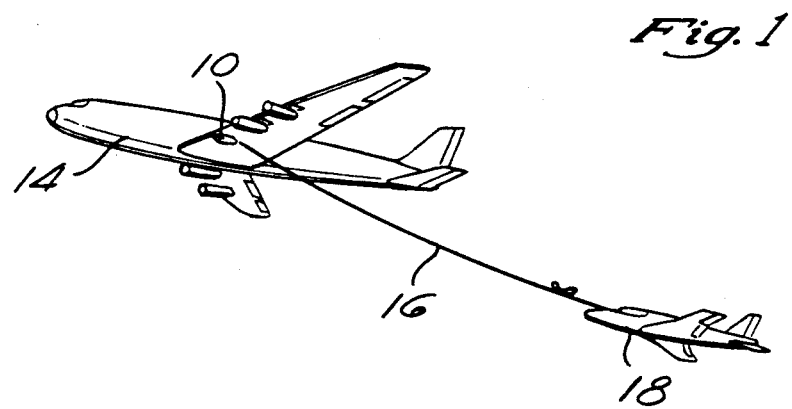
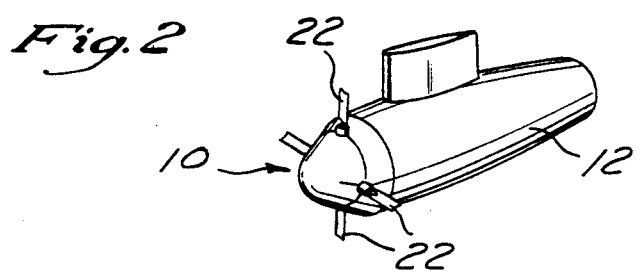
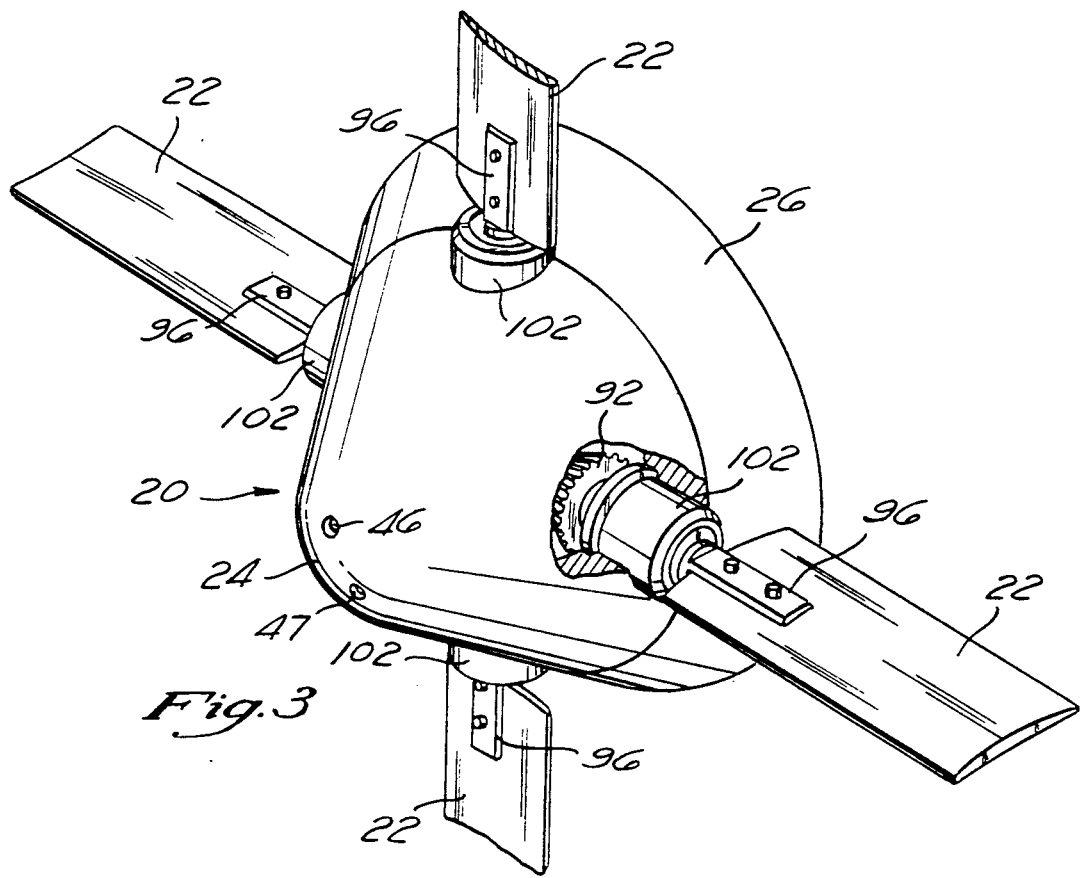

RAM AIR TURBINE

FIELD OF THE INVENTION

The present invention relates generally to aircraft art, and more particularly, to a ram air turbine which extracts ram air energy from a wind stream relative to a moving aircraft for purposes of driving an auxiliary power unit such as a pump or reeling machine interfaced to the turbine.

BACKGROUND OF THE INVENTION

For many years, it has been a common practice to attach refueling pods to certain military aircraft and to use such refueling pods for purposes of conducting inflight refueling operations. Currently-known refueling pods typically comprise a fuel storage area and an elongated hose which is adapted to be reeled in and reeled out from the refueling pod for purposes for providing a fuel supply line from the pod to the aircraft to be refueled. As can be appreciated, the refueling pod must necessarily include a reeling mechanism for reeling in and reeling out the fuel line as well as a pump for pumping fuel from the storage area into the fuel line.

It is well known in the prior art to provide a ram air turbine with the refueling pod for purposes of providing power to the fuel pump and to the reeling mechanism. Additionally, other prior art ram air turbines are used in conjunction with the reeling mechanisms of aerial targets. In this respect, the ram air turbine typically is used to provide power to the reeling mechanism to pay in and pay out the target from the aircraft.

Many of the prior art ram air turbines include variable pitch turbine blades associated therewith. In this respect, such turbines generally include mechanisms adapted to move the turbine blades to a feathered, i.e. non-rotating, position when a fuel pumping or reeling operation is not being conducted and to a power, i.e. rotating, position when power is needed to operate a pump or reeling mechanism. Though these prior art turbines have generally been suitable for most fuel pumping and reeling applications, such turbines possess certain deficiencies which detract from their overall utility. In this respect, the single greatest deficiency relates to the mechanisms used to adjust the turbine blades between the feathered and power positions to maintain desired operational speed.

In prior art ram air turbines, two different types of mechanisms are generally used to vary the turbine blade pitch. The first mechanism is a conventional clutch which is interfaced to both the turbine blades and output shaft of the turbine. The clutch is adapted to drive the turbine blades to a feathered orientation during non-usage and to move the turbine blades back to a power position when needed to operate a pump or reeling device. However, aerodynamic imperfections of the ram air turbine blades may produce a torque when in the feathered position which slowly rotates the clutch pressure plates comprising such clutch mechanisms tending to quickly wear them out and thus require continuous maintenance and expensive repair procedures to maintain the turbine in a properly functioning state.

The second most commonly used mechanism is a mechanical cam plate which is also operable to drive the turbine blades to the feathered or power positions for the previously described reasons. The cam plate however, must be mechanically driven by a bi-directional serve motor that is controlled with a feedback system which must monitor turbine rotational speed. This system is mechanically and electrically complex and a failure of the control system or servo motor could leave the turbine blades in a position that would result in excessive turbine rotational speed if the aircraft's airspeed is increased. The present invention alleviates these and other deficiencies associated with prior art ram art turbines.

SUMMARY OF THE INVENTION

In accordance with the preferred embodiment of the present invention, there is provided a ram air turbine for use in conjunction with refueling pods upon military aircraft. In the preferred embodiment, the ram air turbine comprises a housing which is rotatably connected to a refueling pod. Disposed within the housing is an elongate, main turbine output shaft having a first end rigidly connected to the housing and a second end interfaced to a pump and/or reeling mechanism of the refueling pod. Importantly, the rigid attachment of the output shaft to the housing causes the shaft to rotate concurrently with the housing. Extending outwardly from the housing are a plurality of variable pitch turbine blades which are cooperatively engaged to the housing such that rotation of the turbine blades causes the simultaneous rotation of the housing and hence the output shaft. The ram air turbine further comprises a means disposed within the housing for establishing a preset reference rotational speed for the output shaft. Additionally, a control means is provided which is cooperatively engaged between the turbine blades and the reference means for adjusting the pitch of the turbine blades in response to a difference in the rotational speed of the output shaft and the preset reference rotational speed.

In the preferred embodiment, the reference rotational speed means comprises a brushless DC motor having a stationary internal winding disposed about the output shaft. The motor further comprises outer rotating magnet elements which are disposed about the internal winding. Advantageously, the magnet elements are cooperatively engaged to the control means in a manner operable to cause the control means to rotate each of the turbine blades to a feathered position relative the housing when the rotational speed of the output shaft exceeds the rotational speed of the magnet elements or when the turbine is not being used. The magnet elements are further operable to cause the control means to rotate each of the turbine blades toward a power position relative the housing when the turbine is in use and the rotational speed of the output shaft is less than the rotational speed of the magnet elements. A particular power orientation of the turbine blades is maintained when the turbine is in use and the rotational speed of the output shaft matches the rotational speed of the magnet elements.

The control means of the present invention preferably comprises a gear reduction unit, the motor being disposed within the gear reduction unit such that the magnet elements are cooperatively engaged thereto. In the preferred embodiment, the gear reduction unit is comprised of a planetary reduction stage of approximately 10:1 reduction which drives the input of a harmonic drive having a ring gear, a flexible spline disposed within the ring gear and a wave generator disposed within the flexible spline. The magnet elements of the motor are connected to the wave generator through the planetary gear reduction stage in a manner wherein the rotation of the magnet elements at a speed differing from the rotational speed of the output shaft causes the wave generator to elastically deflect the flexible spline, thereby causing the rotation of the ring gear. The ring gear itself is interfaced to the turbine blades such that rotation thereof in a first direction causes the blades to rotate toward the feathered position while rotation thereof in a second direction causes the turbine blades to rotate toward the power position.

The ram air turbine of the present invention further comprises an electronic speed controller which has a fail safe provision in the event the motor speed exceeds the desired motor speed by a predetermined amount. The fail safe provision is used to apply a dynamic braking force to the magnet elements. The dynamic braking force applied to the magnet elements is operable to cause the control means to rotate the turbine blades toward the feathered position. The fail safe provision preferably comprises a transorb across the internal winding of the motor which acts as a zener diode to shunt the internal winding to ground if the rotational speed of the magnet elements and thus its back emf exceeds the pre-determined maximum.

The present invention may also include, in addition or as an alternative to the fail safe provision, a fail safe mechanical braking means which is also associated with the motor and used for applying a mechanical braking force to the magnet elements when the rotational speed of the magnet elements exceeds the desired reference speed by a pre-determined amount. Like the dynamic braking force applied by the electronic fail safe provision, the mechanical braking force applied to the magnet elements via the mechanical braking means is operable to rotate the turbine blades toward the feathered position. In the preferred embodiment, the mechanical braking means comprises a brake spacer ring which is rigidly attached to the magnet elements. The spacer ring includes at least one radially extending aperture disposed therein. Slidably received into the aperture is a centrifugal brake pad which is retained therein through the utilization of a shear pin. Additionally, a stationary brake drum is disposed about the spacer ring in a manner defining a narrow, annular gap between the brake pad and an inner, annular surface of the drum. In operation, the rotation of the magnet elements beyond the predetermined maximum speed causes the brake pad to rupture the shear pin and move radially outward from within the aperture into abutting contact with the inner surface of the drum thus causing the application of the mechanical braking force to the magnet elements.

BRIEF DESCRIPTION OF THE DRAWINGS

These as well as other features of the present invention will become more apparent upon reference to the drawings wherein:

FIG. 1 is a perspective view of the ram air turbine of the present invention as interfaced to a refueling pod on an aircraft and used during an in-flight refueling operation;

FIG. 2 is a perspective view of the ram air turbine as interfaced to the refueling pod;

FIG. 3 is a perspective view of the housing of the ram air turbine and variable pitch turbine blades extending outwardly therefrom;

DETAILED DESCRIPTION OF THE PREFERRED EMBODIMENT

Figure 4:
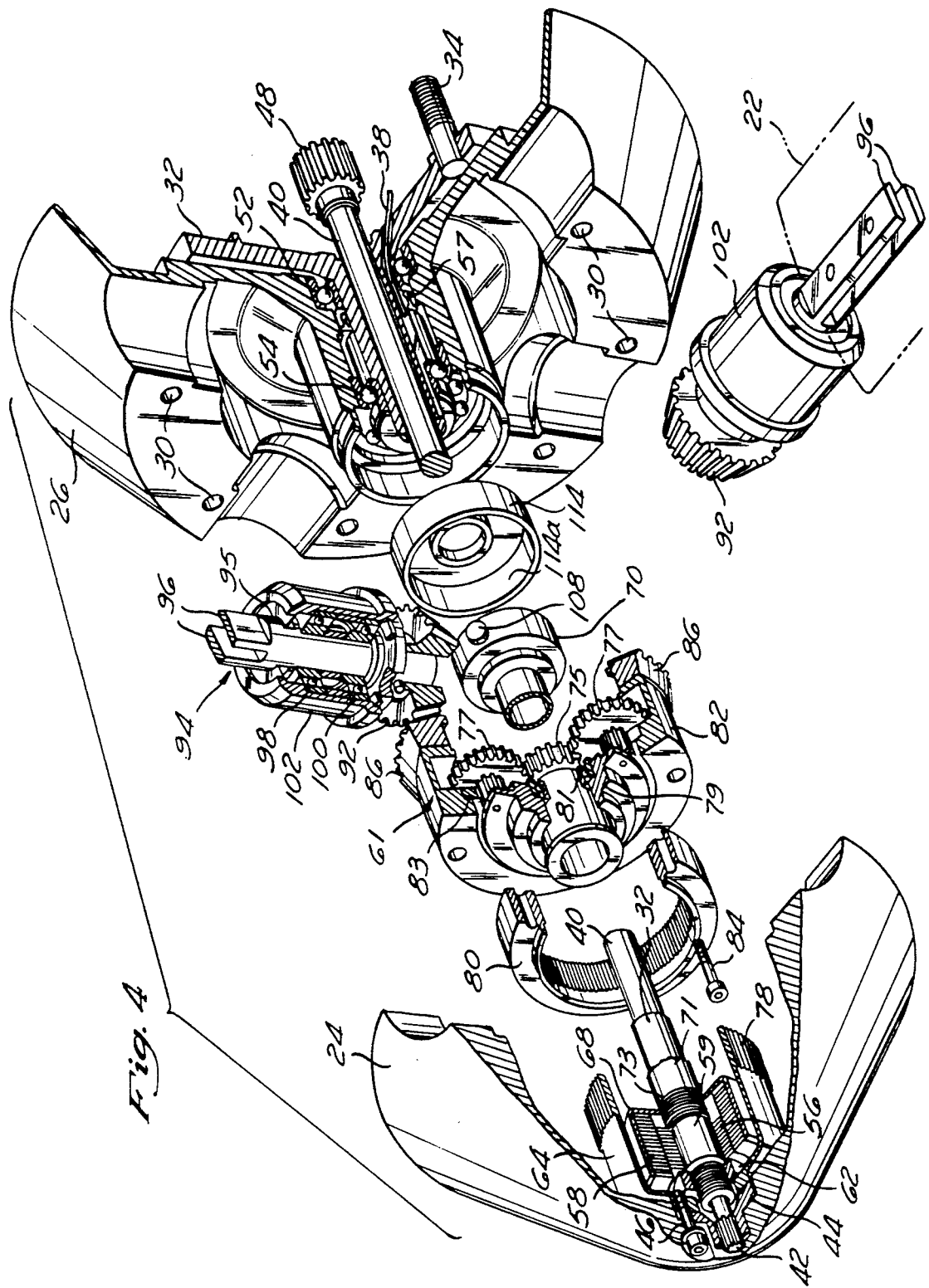
FIG. 4 is an exploded view of the components comprising the ram air turbine.

Referring now to the drawings wherein the showings are for purposes of illustrating a preferred embodiment of the present invention only, and not for purposes of limiting the same, FIG. 2 perspectively illustrates the ram air turbine 10 of the present invention as interfaced to a refueling pod 12. Though the ram air turbine 10 is shown as being interfaced to a refueling pod 12, it will be appreciated that turbine 10 may be utilized in conjunction with other devices such as aerial towed targets and decoys. As seen in FIG. 1, refueling pod 12, and hence turbine 10, are preferably connected to the underside of either the fuselage or wing of an aircraft 14. In operation, ram air turbine 10 is adapted to provide power to a reeling mechanism which is used to pay in and pay out a fuel line 16 from the refueling pod 12 for purposes of refueling an aircraft 18. Additionally, though not shown, turbine 10 may further be interfaced to a pump which is used to pump fuel within the refueling pod 12 through the fuel line 16 and into the aircraft 18.

Referring now to FIG. 3, in the preferred embodiment ram air turbine 10 comprises a housing 20 which is rotatably connected to the refueling pod 12. Extending outwardly from housing 20 are a plurality of variable pitch turbine blades 22. Housing 20 preferably comprises a forward housing 24 having a generally conical configuration and an aft housing 26. In the preferred embodiment, forward housing 24 and aft housing 26 are rigidly connected so as to rotate concurrently relative to the refueling pod 12. Turbine blades 22 are cooperatively engaged to the housing 20 in a manner which will be described in greater detail below, so as to cause the housing 20 to rotate concurrently with the turbine blades 22.

Figure 5:
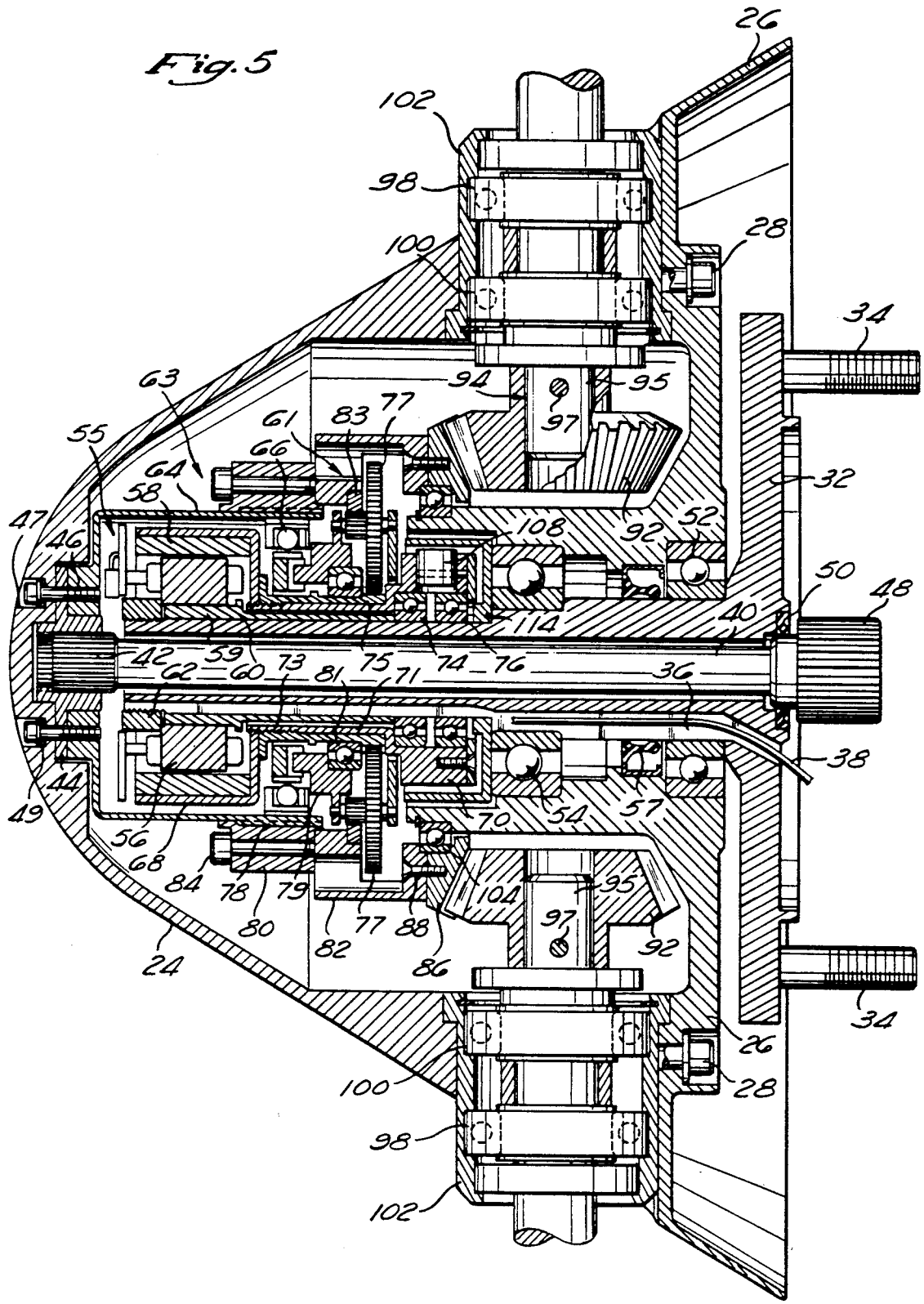
FIG. 5 is a cross-sectional view of the ram air turbine.

Referring now to FIGS. 4 and 5, aft housing 26 is rigidly attached to forward housing 24 via a plurality of fasteners such as bolts 28 which extend through apertures 30 disposed within aft housing 26 and are threadably received into forward housing 24. Disposed within the housing 20 is a base assembly shaft support 32 having a plurality of elongate threaded members 34 extending outwardly therefrom. In the preferred embodiment, shaft support 32 is rigidly attached to the refueling pod 12 via the receipt of threaded members 34 thereinto. As such, shaft support 32 does not rotate relative refueling pod 12. Shaft support 32 further includes a wire groove 36 formed therein which is used to receive one or more wires 38 for reasons which will be discussed in greater detail below.

Received into shaft support 32 is an elongate, main turbine output shaft 40. Disposed on the distal end of output shaft 40 is a spline 42 which is interfaced to a spline drive 44 rigidly attached to the forward housing 24 via fasteners such as bolts 46. The heads of the bolts 46 are disposed within recesses 47 formed within forward housing 24 and are sealed against forward housing 24 through the use of O-rings 49 so as to prevent moisture or other contaminants from entering the interior of housing 20. Due to the rigid attachment of spline drive 44 to forward housing 24, and the engagement of spline 42 to spline drive 44, the rotation of housing 20 causes the simultaneous rotation of output shaft 40. Since output shaft 40 is not attached to shaft support 32, housing 20 and output shaft 40 will rotate simultaneously with shaft support 32 remaining in a fixed orientation. Disposed on the end of output shaft 40 opposite that interfaced to forward housing 24 is a second spline 48 which is used to facilitate the interface of the turbine 10 to the pump and/or reeling mechanism of the refueling pod 12. Additionally, disposed within shaft support 32 adjacent second spline 48 is a seal 50 which is used to prevent contaminants from entering the space between shaft support 32 and output shaft 40.

In the preferred embodiment, to facilitate the rotation of the housing 20 relative the stationary shaft support 32, disposed between the aft housing 26 and the outer surface of the shaft support 32 are a first support bearing 52 and the second support bearing 54. Additionally, disposed between first bearing 52 and second bearing 54 is a seal 57. Due to the rigid attachment of forward housing 24 to aft housing 26, the housing 20 is supported on and rotates relative the shaft support 32 via the support bearings 52 and 54.

As previously specified, the output shaft 40 rotates concurrently with the housing 20. In the preferred embodiment of the present invention, the ram air turbine 10 includes a means disposed within the housing 20 for establishing a preset reference rotational speed for the output shaft 40. The reference rotational speed means preferably comprises a brushless DC motor 55 having an internal winding 56 disposed about the outer surface of shaft support 32 and outer rotating magnet elements 58 disposed about the internal winding 56. As best seen in FIG. 5, the internal winding 56 is stationary and is rigidly held upon the outer surface of a sleeve member 59 mounted to the outer surface of shaft support 32 through the compression thereof between a shoulder 60 formed on the sleeve member 59 and a stop member 62 threadably engaged to the threaded distal end of shaft support 32. Thus, magnet elements 58 are free to rotate about the internal winding 56 which is rigidly maintained upon sleeve member 59. In the preferred embodiment, power is supplied to the motor 55 via the wires 38 extending through the wire groove 36 disposed within the shaft support 32. The manner in which the brushless motor 55 functions as a rotational speed reference will be explained in greater detail below.

The ram air turbine 10 of the present invention further comprises a control means cooperatively engaged between the turbine blades 22 and the motor 55 for adjusting the pitch of the turbine blades 22 in response to a difference in the rotational speed of the output shaft 40 and the preset reference rotational speed of the motor 55, and more particularly, the rotating magnet elements 58. Importantly, the control means is operable to interface the magnet elements 58 to the turbine blades in a manner wherein the magnet elements 58 are operable to cause the control means to rotate each of the turbine blades 22 toward a feathered, i.e. non-rotating, position relative the housing 20 when the rotational speed of the output shaft 40 exceeds the rotational speed of the magnet elements 58 and toward a power, i.e rotating, position relative the housing 20 when the rotational speed of the output shaft 40 is less than the rotational speed of the magnet elements 58. Importantly, the turbine blades 22 are maintained in a particular power position when the rotational speed of the output shaft 40 matches the rotational speed of the magnet elements 58.

In the preferred embodiment of the present invention, the control means comprises a gear reduction unit, and more particularly, a planetary reduction stage 61 and a harmonic drive 63. The harmonic drive 63 preferably comprises a flexible spline 64, a wave generator 66 and a harmonic drive ring gear 80, while the planetary gear reduction stage 61 comprises a sun gear member 75, planet gears 77, planet gear carrier 79 and secondary ring gear 83. The flexible spline 64 is rigidly connected to the forward housing 24 via the threaded receipt of bolts 46 thereinto. In this respect, the bolts 46 extend through forward housing 24, spline drive 44 and are threadably received into flexible spline 64. Thus, due to the rigid attachment of flexible spline 64 to forward housing 24, flexible spline 64 rotates concurrently with the housing 20 and output shaft 40. In the preferred embodiment, the motor 55, i.e. the internal winding 56 and rotating magnet elements 58, are disposed within the flexible spline 64. Also disposed within the flexible spline 64 is the wave generator 66. Additionally, attached to the outer surface of the rotating magnet elements 58 is an annular ring 68, while attached to annular ring 68 is a brake ring 70 which includes a tubular portion 71 having a threaded distal end 73. In the preferred embodiment, brake ring 70 is oriented such that the tubular portion 71 thereof is disposed above but not connected to the outer surface of sleeve member 59 and is threadably attached to annular ring 68 via the engagement of threaded distal end 73 to a corresponding female threaded formed in annular ring 68. Rigidly attached to the outer surface of brake ring 70, and more particularly the tubular portion 71 thereof, is the sun gear member 75 which is cooperatively engaged to the planet gears 77 of planetary reduction stage 61.

In the preferred embodiment, the planet gears 77 are interfaced to the wave generator 66 via the planet gear carrier 79 which is rotatable relative sun gear member 75 via a bearing 81 disposed between carrier 79 and the outer surface of sun gear member 75. During operation of the ram air turbine 10, annular ring 68, brake ring 70 and sun gear member 75 rotate concurrently with magnet elements 58. As will be recognized, the rotation of sun gear member 75 causes the rotation of planet gears 77 and hence the rotation of planet gear carrier 79. Due to the attachment of wave generator 66 to gear carrier 79, the rotation of gear carrier 79 causes the rotation of wave generator 66. As such, the rotation of the wave generator 66 is directly dependent upon the rotation of the magnet elements 58. In the preferred embodiment, the planetary reduction stage 61 is adapted to provide a 10:1 reduction. Thus, when the housing 20 is stationary, the rotational velocity of the wave generator 66 will be 1/10 the rotational velocity of the magnet elements 58. Brake ring 70 is preferably supported upon adjacent bearings 74 and 76 which are disposed between brake ring 70 and the outer surface of shaft support 32.

As best seen in FIG. 4, flexible spline 64 includes a spline portion 78 formed about the outer surface thereof. Disposed about flexible spline 64 is the harmonic drive ring gear 80 which is engaged to the spline portion 78 of flexible spline 64. Importantly, the spline portion 78 includes less teeth than the internal portion of ring gear 80. In this respect, the rotation of the magnet elements 58 and hence the wave generator 66 at a velocity greater than or less than rotational velocity of the flexible spline 64 and ring gear 80 will cause the flexible spline 64 to change its orientation within the ring gear 80 thereby causing the ring gear 80 to rotate relative the wave generator 66. In the preferred embodiment, the harmonic drive 63 is adapted to provide a 200:1 reduction. As such, the combination of the harmonic drive 63 with the planetary reduction stage 61 is able to provide an overall reduction of approximately 2000:1 between the rotational velocity of the magnet elements 58 and rotational velocity of the ring gear 80 when the housing 20 is stationary.

The control means of the present invention further comprises a spacer 82 which is rigidly attached to the ring gear 80 via bolts 84 which extend through the ring gear 80 and are threadably received into the spacer 82. The spacer 82 is interfaced to the planetary reduction stage 61 via the secondary ring gear 83. Rigidly attached to the spacer 82 is a bevel ring gear 86 which is connected to the spacer 82 via screws 88 which extend through spacer 82 and are threadably received into bevel ring gear 86. The ring gear 86 is engaged to a plurality of bevel gears 92 which are rigidly connected to support shafts 94 attached to each of the turbine blades 22. Each of the support shafts 94 comprises an elongate cylindrical portion 95 having two juxtaposed members 96 formed on one end thereof which are adapted to receive a turbine blade 22 therebetween. The rigid attachment of a bevel gear 92 to a support shaft 94 is facilitated by a pin 97 which extends through the bevel gear 92 and is received into the cylindrical portion 95 of the support shaft 94. The cylindrical portion 95 of each support shaft 94 extends through an upper bearing 98 and a lower bearing 100 before being received into a bevel gear 92. In the preferred embodiment, both the upper bearing 98 and lower bearing 100 are rigidly disposed within a collar 102 which is oriented between the aft housing 26 and forward housing 24 and rigidly attached to the housing 20. Due to the rigid connection of the cylindrical portions 95 of the support shafts 94 to the bevel gears 92, the bevel gears 92 and support shafts 94 will rotate concurrently. In this respect, the rotation of bevel gears 92 causes the cylindrical portions 95 of the support shafts 94 to rotate relative the collars 102 and hence the housing 20. As will be recognized, rotation of the bevel ring gear 86 in a first direction, i.e. a clockwise direction, will cause each of the bevel gears 92 to rotate in a counter-clockwise direction thereby causing the support shafts 94 and turbine blades 22 rigidly attached thereto to rotate in a counter-clockwise direction relative the housing 20. Conversely, as ring gear 86 rotates in a second direction, i.e. a counter-clockwise direction, the bevel gears 92 will rotate in a clockwise direction thereby causing the support shafts 94 and turbine blades 22 to rotate in a clockwise direction relative the housing 20.

Having thus described the primary components of the ram air turbine 10 of the present invention, the operation thereof will now be explained. As previously indicated, the brushless DC motor 55 is used as a means for establishing a preset reference rotational speed for the output shaft 40. In the preferred embodiment, the preset reference rotational speed at which the motor 55 is set is 4,000 rpm. However, other rotational speeds are contemplated and may be accomplished using conventional means. When the aircraft 14 first assumes flight, the turbine blades 22 are preferably in a fully feathered position, i.e. not able to cause the rotation of the housing 20 and output shaft 40 when impinged by an air stream. When activation of the ram air turbine is desired, such activation initially occurs through the energizing of the motor 55. In this respect, the energization of the internal winding 56 or the motor 55 causes the magnet elements 58 to rotate at approximately 4,000 rpm (the preset limit) about the internal winding 56. Since the housing 20 is not rotating due to the initial feathered orientation of the turbine blades 22, the magnet elements 58 will be rotating at approximately 4,000 rpm with the wave generator 66 rotating at approximately 400 rpm relative the flexible spline 64 due to the 10:1 reduction facilitated by the planetary reduction stage 61. This rotational speed disparity between the wave generator 66 and flexible spline 64 causes the wave generator 66 to elastically deflect the flexible spline 64. Due to the interface of the spline portion 78 of the flexible spline 64 to the ring gear 80, the deflection of the flexible spline 64 therewithin will cause the ring gear 80 to rotate in a counter-clockwise direction (at approximately 2 rpm due the 200:1 reduction facilitated by the harmonic drive 63). Since both spacer 82 and bevel ring gear 86 are rigidly attached to harmonic drive ring gear 80, these components will rotate concurrently with ring gear 80. Thus, bevel ring gear 86 will likewise rotate in a counter-clockwise direction thereby causing bevel gears 92 to rotate in a clockwise direction at approximately 2 rpm's. The simultaneous clockwise rotation of support shafts 94 attached to the bevel gears 92 causes the turbine blades 22 to rotate from the feathered position to a power position, i.e. a position wherein an air stream may impinge the turbine blades so as to cause rotation of the housing 20 in a counter-clockwise direction.

When the force of the air stream against the turbine blades 22 causes the turbine blades 22 and hence the housing 20 and output shaft 40 to reach a rotational speed velocity matching the velocity of the rotating magnet elements 58, i.e. 4,000 rpm, the bevel ring gear 86, spacer 82 and harmonic drive ring gear 80 as well as the reduction stage 61 and wave generator 66 will likewise be rotating at a velocity of 4,000 rpm. Thus, since the components comprising the harmonic drive 63, i.e. the ring gear 80, flexible spline 64 and wave generator 66, are rotating at the same velocity, flexible spline 64 will not be deflected within ring gear 80 and thus not cause any relative movement of ring gear 80 thereto. As such, the turbine blades 22 will remain in their particular power orientation.

Figure 7:
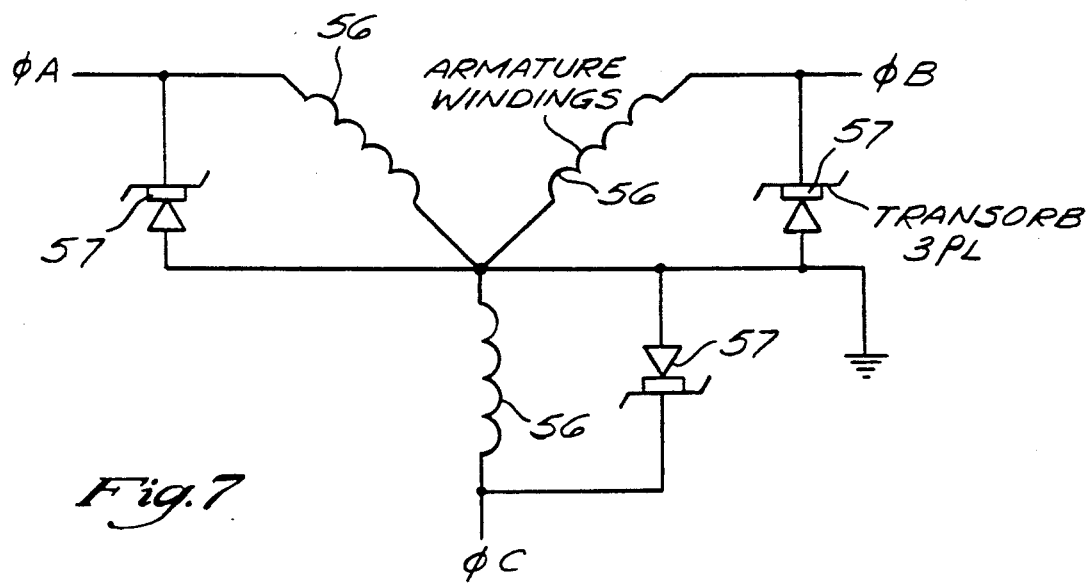
FIG. 7 is an electrical schematic illustrating the electronic speed controller of the ram air turbine.

When the rotational speed of the turbine blades 22 and hence the output shaft 40 exceeds the rotational speed of the magnet elements 58, due to the rigid attachment of flexible spline 64 to forward housing 24, both the flexible spline 64 and harmonic drive ring gear 80 will be rotating at a velocity exceeding the rotational velocity of magnet elements 58, planetary reduction stage 61, and wave generator 66. This rotational speed differential causes the wave generator 66 to elastically deflect the flexible spline 64 within ring gear 80 so as to cause ring gear 80 to move in a clockwise direction relative the rotational direction of the housing 20. As previously specified, the clockwise rotation of ring gear 80 causes the clockwise rotation of bevel ring gear 86 which in turn causes the counter-clockwise rotation of bevel gears 92 and support shafts 94. The counter-clockwise rotation of support shafts 94 causes the turbine blades 22 to rotate from the power position back toward the feathered position thereby decreasing the rotational speed of the housing 20 and output shaft 40 to a speed matching the rotational speed of the magnet elements 58. Thus, the movement of the turbine blades 22 between the feathered and power positions is dependent on whether or not the rotational speed of the output shaft 40 exceeds or is less than the rotational speed of the magnet elements 58. As will be recognized, the turbine blades 22 will remain stationary in a particular power orientation when the rotational speed of the output shaft 40 matches the rotational speed of the magnet elements 58. As seen in FIG. 5, the harmonic drive ring gear 80, spacer 82 and bevel ring gear 86 are adapted to rotate relative the flexible spline 64 via a bearing 104 interfacing the bevel ring gear 86 to the interior portion of the aft housing 26. The ram air turbine 10 of the present invention further comprises an electronic speed controller in electrical communication with the motor 55 for applying a dynamic braking force to the magnet elements 58 when the rotational speed of the magnet elements 58 exceeds a predetermined maximum rotational speed. Referring now to FIG. 7, the electronic speed controller preferably comprises transorbs 57 across the internal windings 56. The transorbs 57 act as shunts that will fail short in an over-voltage of approximately 50 volts. In this respect, if the motor speed exceeds 7,500 rpm, the back EMF generated by the motor 55 will cause the transorbs 57 to short to ground. Such shorting to ground will in turn cause the motor 55 to be dynamically braked thereby feathering the turbine blades in the manner previously discussed.

Figure 6:
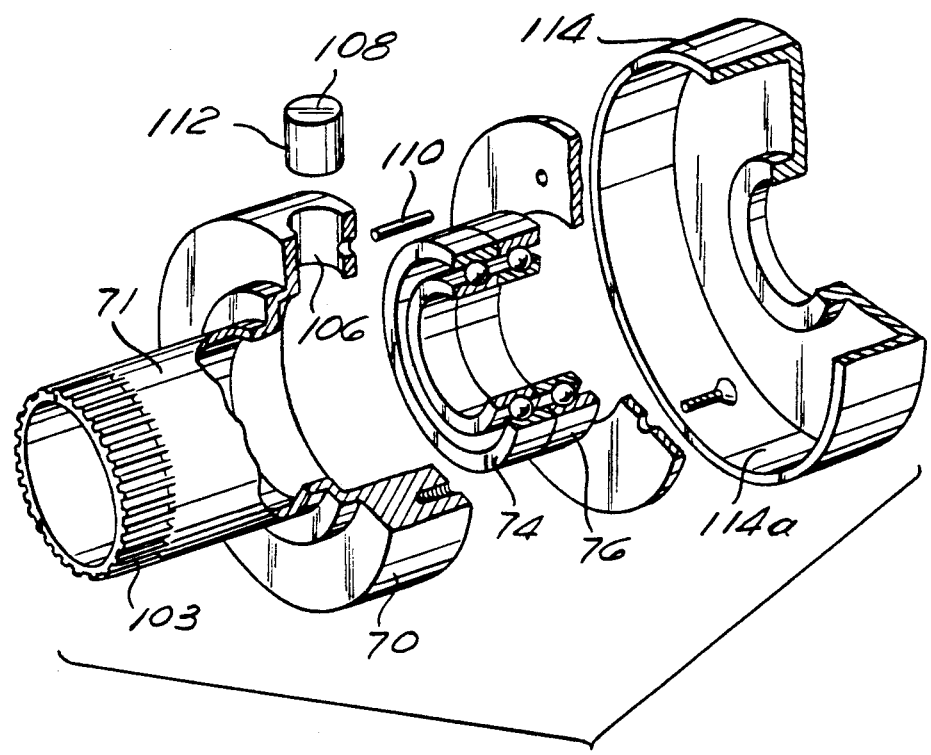
FIG. 6 is an exploded view of the components comprising the mechanical braking means of the ram air turbine.

Referring now to FIG. 6, in addition or as an alternative to the electronic speed controller, the ram air turbine 10 of the present invention may further include a mechanical braking means associated with the motor 55 for applying a mechanical braking force to the magnet elements 58 when the rotational speed of the magnet elements 58 exceeds the predetermined maximum. In the preferred embodiment, the mechanical braking means comprises at least one generally cylindrical aperture 106 radially disposed within the brake ring 70. Slidably received into the aperture 106 is a complimentarily configured centrifugal brake pad 108. In the preferred embodiment, brake pad 108 is retained within aperture 106 via a shear pin 110 which extends through an aperture 112 extending transversely through brake pad 108. Disposed about the brake ring 70 is a stationary brake drum 114 which is rigidly attached to the shaft support 32. Importantly, brake drum 114 is disposed about brake spacer ring 70 in a manner defining a narrow, annular gap between the brake pad 108 and an inner annular surface 114a of brake drum 114. As previously specified, brake ring 70 will rotate at the same velocity as magnet elements 58 due to its rigid connection thereto via annular ring 68. When magnet elements 58 exceed their maximum rotational velocity of 7,500 rpm, the rotation of brake ring 70 at this velocity causes the brake pad 108 to rupture the shear pin 110 and move radially outward within aperture 112 so as to come into abutting contact with the inner surface 114a of brake drum 114. As can be recognized, such abutting contact against the inner surface 114a causes a mechanical braking force to be applied to magnet elements 58. This braking force will also cause the turbine blades 22 to move to the feathered position in the same manner as previously discussed.

Additional modifications and improvements of the present invention may also be apparent to those skilled in the art. Thus, the particular combination of parts as described and illustrated herein is intended to represent only one embodiment of the invention, and is not intended to serve as limitations of alternative devices within the spirit and scope of the invention.

What is claimed is:
1. A ram air turbine comprising:
a rotatable housing;
a main turbine output shaft disposed within said housing and having a first end rigidly connected thereto;
a plurality of variable pitch turbine blades extending outwardly from and cooperatively engaged to said housing such that rotation of said turbine blades causes simultaneous rotation of said housing and said shaft;
a DC motor disposed within said housing for establishing a preset reference rotational speed for said shaft, said DC motor having a stationary internal winding disposed about said output shaft and outer rotating magnet elements disposed about said internal winding; and
a gear reduction unit cooperatively engaged between said turbine blades and said DC motor for adjusting the pitch of said turbine blades in response to a difference in the rotational speed of said shaft and the preset reference rotational speed, said gear reduction unit comprising a harmonic drive having a ring gear, a flexible spline disposed within said ring gear, a flexible spline disposed within said ring gear, and a wave generator disposed within said flexible spline;
said magnet elements being interfaced to said wave generator in a manner wherein the rotation of said magnet elements at a speed differing from the rotational speed of said shaft causes said wave generator to elastically deflect said flexible spline, thereby causing the rotation of said ring gear in a manner operable to rotate each of the turbine blades towards a non-rotating position when the rotational speed of said shaft exceeds the rotational speed of said magnet elements and toward a rotating position when the rotational speed of said shaft is less than the rotational speed of said magnet elements.

2. The device of claim 1 wherein said ring gear is interfaced to said turbine blades in a manner such that rotation of said ring gear in a first direction causes the turbine blades to rotate toward said rotating position and rotation of said ring gear in a second direction causes the turbine blades to rotate toward said non-rotating position.

3. The device of claim 2 wherein said reduction unit further comprises a planetary gear reducing stage interfacing said magnet elements to said wave generator.

4. The device of claim 3 wherein said planetary gear reducing stage is adapted to provide to a 10 to 1 rotational velocity reduction between said magnet elements and said wave generator and said harmonic drive is adapted to provide a 200 to 1 rotational velocity reduction between said wave generator and said ring gear.

5. The device of claim 1 further comprising an electric speed controller in electrical communication with said motor for applying a dynamic braking force to said magnet elements when the rotational speed of said magnet elements exceeds a pre-determined maximum.

6. The device of claim 5 wherein said electronic speed controller comprises a transorb across the internal winding, said transorb acting as a zener diode to shunt the internal winding to ground when the rotational speed of the magnet elements exceeds said predetermined maximum.

7. The device of claim 1 further comprising a mechanical braking means associated with said motor for applying a mechanical braking force to said magnet elements when the rotational speed of said magnet elements exceeds a pre-determined maximum.

8. The device of claim 7 wherein said braking means comprises:
- a brake spacer ring rigidly attached to said magnet elements, said spacer ring having at least one radially extending aperture disposed therein;
- a centrifugal brake pad slidably received into said aperture, said pad being retained within said aperture by a shear pin; and
- a stationary brake drum disposed said spacer ring in a manner defining a narrow annular gap between said brake pad and an inner, annular surface of said drum;
- wherein the rotation of said magnet element beyond the pre-determined maximum speed causes said brake pad to rupture said shear pin and move radially outward from within said aperture into abutting contact with said inner surface of said drum.

9. The device of claim 1 wherein said rotatable housing has a forward section and an aft section, said turbine blades extending outwardly from and being cooperatively engaged to said housing between the forward and aft sections thereof, and said reference speed means being disposed within the forward section of said housing.

* * * * *